July 10, 1923.

Re. 15,646

C. R. WOOD

POCKET FOR WEARING APPAREL

Original Filed Jan. 7, 1922 2 Sheets-Sheet 1

Inventor

Charles R. Wood.

By Watson E. Coleman.

Attorney

July 10, 1923.
Re. 15,646
C. R. WOOD
POCKET FOR WEARING APPAREL
Original Filed Jan. 7, 1922
2 Sheets-Sheet 2
Fig. 4.
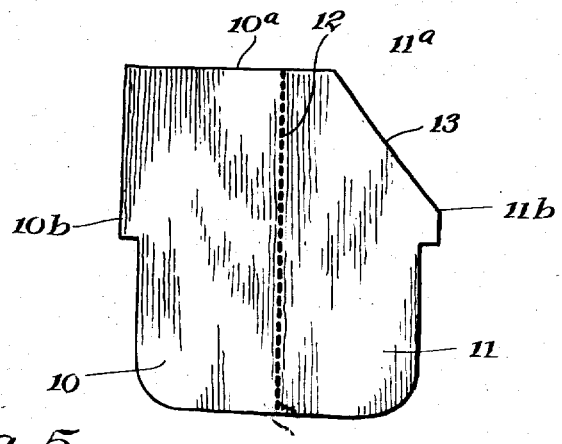
Fig. 5.
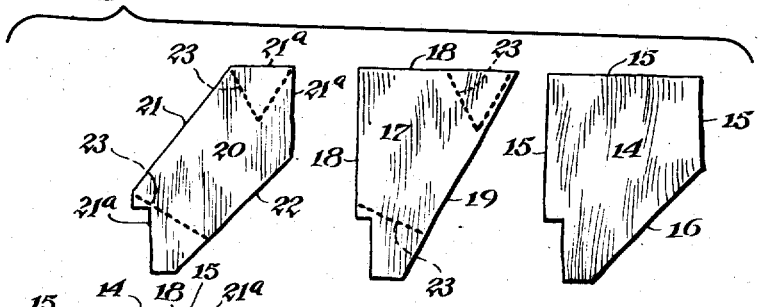
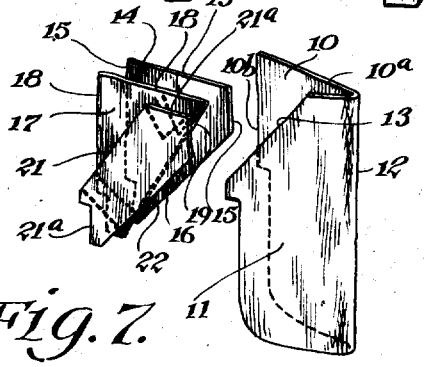
Fig. 6
Fig. 7.
Inventor
Charles R. Wood.
By Watson E. Coleman.
Attorney Reissued July 10, 1923. Re. 15,646

UNITED STATES PATENT OFFICE.

CHARLES R. WOOD, OF FARGO, NORTH DAKOTA.

POCKET FOR WEARING APPAREL.

Original No. 1,401,376, dated October 10, 1922, Serial No. 537,635, filed January 7, 1922. Application for reissue filed February 26, 1923. Serial No. 621,863.

To all whom it may concern:

Be it known that I, CHARLES R. WOOD, a citizen of the United States, residing at Fargo, in the county of Cass and State of North Dakota, have invented certain new and useful Improvements in Pockets for Wearing Apparel, of which the following is a specification, reference being had to the accompanying drawings.

This invention relates to improvements in pockets for wearing apparel, and more particularly to a pocket having means preventing lint from the pocket of articles contained therein when the pocket is inverted.

A further object of the invention is to provide a structure of this character having flaps upon the interior of the pocket so constructed and arranged as to form within the pocket a funnel loosely extending into the pocket and free from engagement with the pocket walls, which funnel will permit admittance of the hand to the pocket but is so connected with the pocket in construction that the hand upon being withdrawn will not withdraw the funnel therewith.

A further object is the provision of a pocket including flaps in spaced number which are arranged to form this funnel and including, if desired, other flaps assisting in guiding away from the pocket opening the contents of the pocket.

To these and other objects I attain by the construction and arrangement shown in the accompanying drawings, wherein, for the purpose of illustration, is shown a preferred embodiment of my invention and wherein like reference characters designate like parts throughout.

In the drawings:

Figure 4 is a top plan view of the blank from which the pocket is formed;

Figures 5 illustrates collective views of a plurality of lock pieces or walls for the pockets;

Figure 6 is a detail perspective view of the pocket blank showing it folded;

Figure 7 is a collective perspective of the lock walls, showing the same positioned for insertion in the pocket blank.

Figure 1:
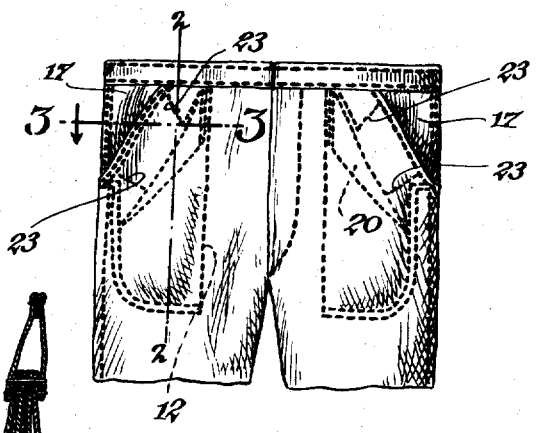
Figure 1 is a view of a portion of a pair of trousers or overalls showing pockets constructed in accordance with my invention applied thereto.
Figure 2:
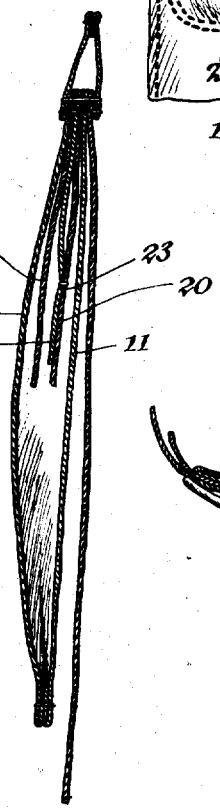
Figure 2 is a vertical sectional view on the line 2-2 of Figure 1, showing the construction of the pocket and lock.
Figure 3:
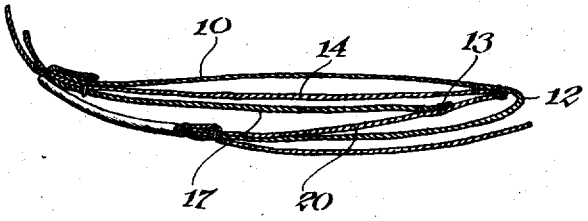
Figure 3 is a transverse sectional view on the line 3-3 of Figure 1.

Referring now to the drawings and more particularly to Figure 4 thereof, in which is shown the blank from which the pocket is formed, the numeral 10 designates the inner section of the pocket blank and 11 the outer section, the pocket blank being folded upon the line 12, as indicated in Figure 6, to bring the edges of the pocket into the proper relation, these edges being connected together about a major portion of their length, a space designated between $10^a$ and $10^b$ of the edge of the blank 10 being left free in such connection and between $11^a$ and $11^b$ of the blank 11 being likewise left free, these free sections affording a pocket opening by means of which access may be had to the space between the inner and outer sections 10 and 11.

In the present instance, the outer wall 11 is disclosed as having that section thereof which is left free cut to form an inclined edge at the pocket opening such as is ordinarily employed in the formation of pockets for overalls. Hereinafter in the specification and the claims in referring to the free portion of the sections forming the pocket opening it will be understood that that portion of the outer edge of the section 10 between the points $10^a$ and $10^b$ is referred to and that portion of the section 11 between the points $11^a$ and $11^b$.

In accordance with my invention, I provide a piece of fabric 14 having edges 15 corresponding to the shaping of the edges of the upper end of the section 10 and an edge 16 connecting such edges 15. The piece of fabric 14 is adapted for attachment to the section 10 in place thereon, the edges 15 corresponding to the corresponding edges of the section 10 and when so applied with the section 11 folded upon the section 10 lies between the sections 10 and 11 and has its edge 16 in spaced relation to and substantially paralleling the inclined edge 13 of the section 11. A facing strip 17 is provided likewise conforming to the shaping of the upper corner of the section 10 having edges 18 which are arranged to correspond to the edges of the section 10 and secured thereto and an edge 19 corresponding to the edge 16 of the section 14 and substantially paralleling the same. A third fabric strip 20 is provided having an edge portion 21 corresponding to the edge portion 13 of the section 11 and adjacent edge portions 21a corresponding to the edges of the section 11 adjacent said inclined edge portion 13 and which are attached thereto, the edge portion 21 being secured to the edge 13. The piece 20 has a free edge 22 substantially paralleling the edge 21 thereof and corresponding to the edges 16 and 19 of the pieces 14 and 17 when in applied position within the pocket.

It will thus be seen that in the completed pocket the inner section 10 has secured thereto at the pocket opening two fabric pieces 14 and 17, one of which serves as a facing for the pocket, and that the section 11 has secured thereto a fabric piece 20 at such pocket opening. All of the fabric pieces 20, 17 and 14 extend into the pocket proper and since their edges are engaged with the edge stitching of the sections 10 and 11 are held against movement therein. Considering the pocket as having contents and that the same is inverted, that portion of the contents falling between the strip 20 and the section 11 will be withheld from the opening, those portions of the contents falling between the strips 17 and 14 will be maintained therebetween and withheld from the opening, and those portions of the contents falling between the strip 14 and the section 10 of the pocket will likewise be withheld from the opening. However, such portions of the contents as might pass between the fabric strips 20 and 17 would be guided to the opening and pass therethrough, permitting their loss from the pocket. Accordingly, to prevent such passage I provide from the edges of the pocket opening connections 23 between the fabric strips 20 and 17, these connections being in the form of stitching connecting the pieces 20 ad 17 and extending from their respective corners of the pocket opening toward that end of the pocket remote from such pocket opening. The ends of these stitchings are so arranged that they are spaced from the adjacent side edges of the sections 10 and 11.

It will be understood by those familiar with the art that an article, such as a coin or the like, contained in the pocket, upon shifting of the body will fall to one side or the other of the pocket and if the pocket is reversed will have a tendency to follow this wall to its end, the ends of the stitchings 23 being spaced from the adjacent walls, and the articles following the walls it will follow that such articles will come into engagement with such lines of stitching and be prevented from following the space between the pieces 17 and 20 and escaping from the opening. The only possible manner in which articles could escape from the opening would be for such articles to fall in such manner as to pass directly between the sections 20 and 17 and between the stitchings 23 connecting these sections, and the likelihood of any article so falling is extremely small.

While I have here described the use of three fabric pieces 14, 17 and 20, it will be obvious from an inspection that the fabric piece 14 might be eliminated with but a slight loss of efficiency in the completed pocket. It will likewise be obvious that while the stitchings 23 perform an important function in the pocket, they are not indispensable and could possibly be eliminated. The elimination, however, is undesirable, since such elimination greatly decreases the efficiency of the pocket.

Particular attention is directed to the fact that those portions of the fabric pieces lying between the side edges of the sections 10 and 11 are entirely free from connection therewith, this being the primary feature lending efficiency to a pocket lock constructed in accordance with this invention. I am aware that heretofore attempts have been made to provide protecting flaps of this character but all of these attempts, so far as I am aware, embodied an attachment between the locking flaps and at least one wall section of the pocket, with the result that the pocket flaps have a tendency to lay against such wall and follow the movement thereof so that it follows that articles sliding upon this wall of the pocket might have a tendency to engage between the flaps and pass through the pocket opening. I accordingly do not claim as new the use of pocket flaps for retaining contents within the pocket but the provision of these flaps in such manner as hereinafter claimed.

I claim:—

1. The combination with a pocket having an opening and two pieces of material secured together and to the pocket at the edges of the opening forming a loss preventing apron extending into the pocket from the opening, of flexible connections between the extreme inner end of the apron and the body of the pocket permitting complete separation of the apron from the walls of the pocket, preventing withdrawal of the inner end of the apron through the pocket opening and maintaining the inner end edges of the apron stretched and in contacting relation.

2. In a pocket, the combination with inner and outer pocket sections connected together about the major portions of their edges and having the remaining portion of their edges free to form a pocket opening affording access to the space between the sections, of a plurality of fabric pieces disposed within said space extending entirely across the pocket and each having an inner edge portion opposing the edge of the pocket opening and spaced from the pocket opening in a direction leading into the pocket from the opening, and an outer edge portion conforming to the shaping of one or the other of the pocket sections at the pocket opening and secured to the respective sections to which they conform at the opening, the ends of the fabric pieces being included in the edge connection of the pocket at points spaced from the ends of the pocket opening and in approximate alignment with said inner edge portions of said fabric pieces and connections between said fabric pieces permitting the introduction of the hand between the fabric pieces and preventing the passage of articles following the edge connection of the pocket sections from passing between the fabric pieces to the pocket opening.

3. In a pocket, the combination with inner and outer pocket sections connected together about the major portions of their edges and having the remaining portion of their edges free to form a pocket opening affording access to the space between the sections, of a plurality of fabric pieces disposed within said space each having an inner edge portion opposing the edge of the pocket opening and spaced from the pocket opening in a direction leading into the pocket from the opening and an outer edge portion conforming to the shaping of one or the other of the pocket sections at the pocket opening and secured to the respective sections to which they conform at the opening, the fabric pieces being included in the edge connection of the pocket at points spaced from the ends of the pocket opening and in approximate alignment with said inner edge portions of said fabric pieces and stitching connecting the fabric pieces extending from the ends of the pocket opening in a direction inwardly of the pocket.

4. The combination with a pocket having an opening, of two pieces of material secured together and to the pocket at the edges of the opening forming an apron having an obliquely disposed inner end, and a connection between the ends of the extreme inner end of the apron and the body permitting complete separation of the apron from the walls of the pocket and holding the inner edges of the apron stretched and in contacting relation.

In testimony whereof I hereunto affix my signature.

CHARLES R. WOOD.